United States Patent
Sheng

(10) Patent No.: US 6,246,131 B1
(45) Date of Patent: Jun. 12, 2001

(54) MAGNETIC POWER APPARATUS

(76) Inventor: Chih-Sheng Sheng, No. 100, Tzu Chiang W. Road, Kweishan Hsiang, Tao-Yuan Hsien (TW)

( * ) Notice: Subject to any disclaimer, the term of this patent is extended or adjusted under 35 U.S.C. 154(b) by 0 days.

(21) Appl. No.: 09/471,132

(22) Filed: Dec. 23, 1999

(51) Int. Cl.$^7$ ............................ H02K 41/00; H02K 33/00
(52) U.S. Cl. ............................... 310/12; 310/15; 310/30; 318/135
(58) Field of Search .................... 310/103, 12, 13, 310/14, 15, 20, 23, 27, 28, 30, 34, 36; 318/114, 122, 126, 127, 130, 135

(56) References Cited

U.S. PATENT DOCUMENTS

| | | | |
|---|---|---|---|
| 3,103,603 | * 9/1963 | Reutter | 310/30 |
| 3,766,455 | * 10/1973 | Zakrewsky et al. | 318/135 |
| 3,931,554 | * 1/1976 | Spentzas | 318/122 |
| 3,981,245 | * 9/1976 | Buzzell et al. | 102/70.2 GA |
| 4,127,835 | * 11/1978 | Knutson | 335/266 |
| 4,315,197 | * 2/1982 | Studer | 318/135 |
| 4,553,074 | * 11/1985 | Jacquemet | 318/130 |
| 4,656,400 | * 4/1987 | Pailthorp et al. | 318/135 |
| 4,659,969 | * 4/1987 | Stupak, Jr. | 318/128 |
| 5,521,446 | * 5/1996 | Chalupa | 310/12 |
| 5,627,418 | * 5/1997 | Satoni et al. | 310/12 |
| 5,820,104 | * 10/1998 | Koyano et al. | 251/326 |
| 6,133,701 | * 10/2000 | Gokturk et al. | 318/114 |

* cited by examiner

Primary Examiner—Elvin Enad
Assistant Examiner—Dang Dinh Le
(74) Attorney, Agent, or Firm—Rosenberg, Klein & Lee

(57) ABSTRACT

A magnetic power apparatus includes an outer shell made of magnetically conductive metal, the outer shell having a through hole on one side wall thereof, an iron core axially movably disposed inside the outer shell, a coil positioned in the outer shell around the iron core and controlled to move the iron core axially in the outer shell, a first permanent magnet and a second permanent magnet symmetrically mounted inside the outer shell and axially aligned at two opposite sides of the iron core with same pole aimed against each other, and a driving circuit disposed outside the outer shell and connected with a power output line thereof to the coil to charge a capacitor, the driving circuit outputting to the coil a positive impulse voltage when electrically connected, or a negative impulse voltage when electrically disconnected, causing the iron core to shift the iron core, and causing the first permanent magnet and the second permanent magnet to change magnetic path and to keep the iron core in shifted position.

4 Claims, 7 Drawing Sheets

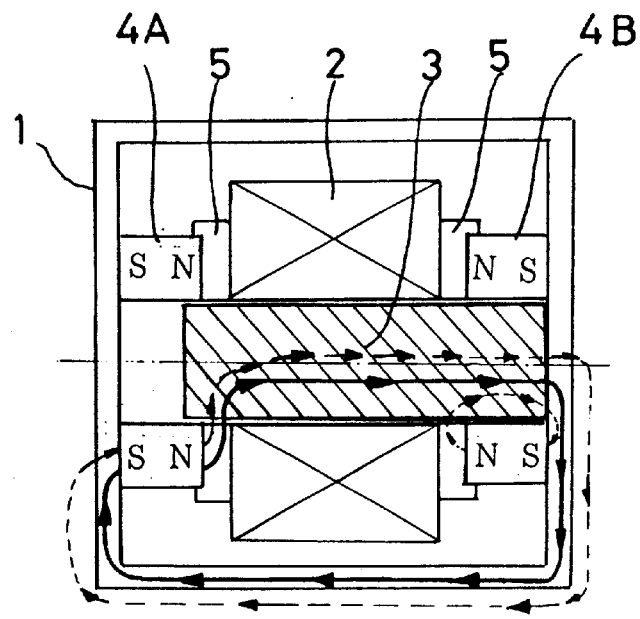
F I G. 3
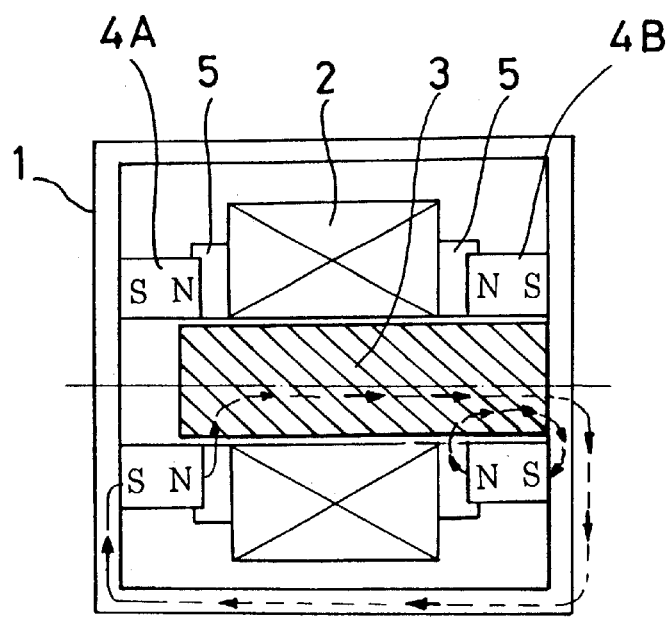
F I G. 4

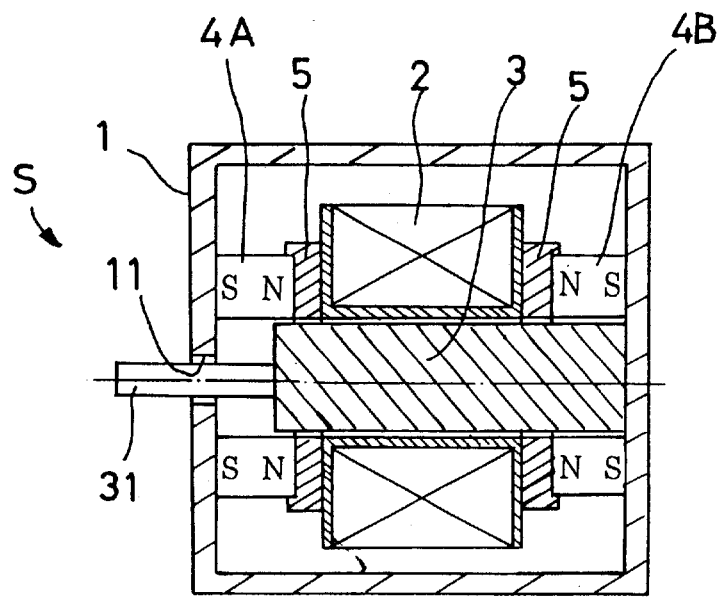
F I G. 9
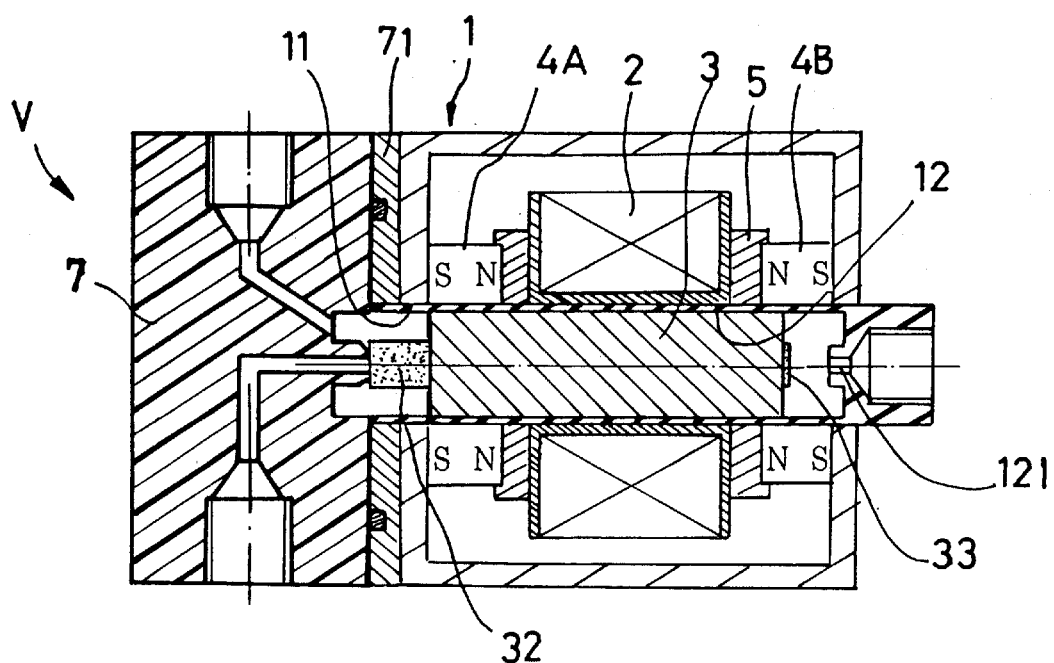
F I G. 10

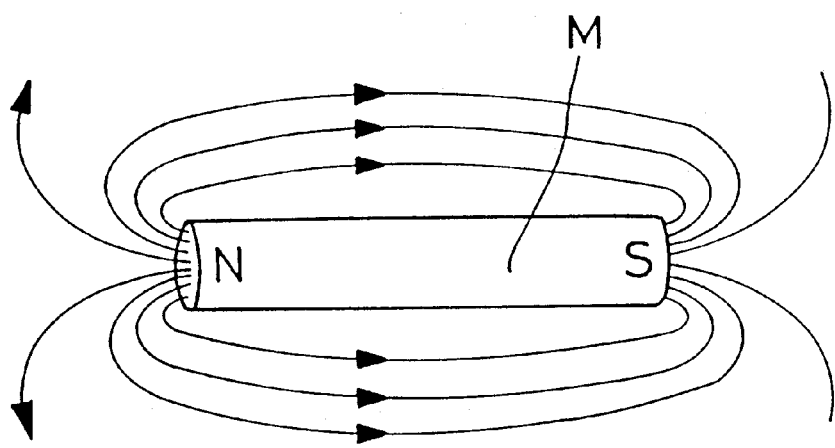
F I G.11
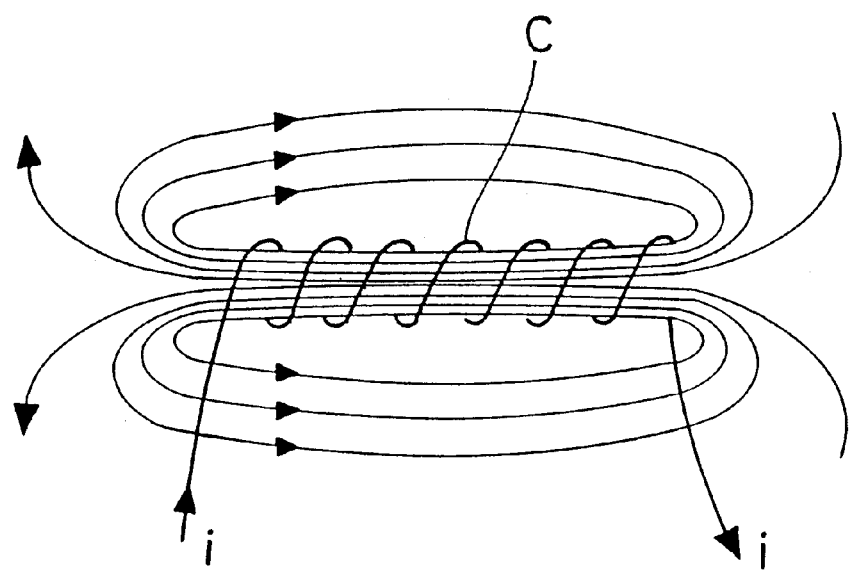
F I G.12

MAGNETIC POWER APPARATUS

BACKGROUND OF THE INVENTION

The present invention relates to a magnetic power apparatus for use in electromagnetic valves, solenoids, relays, etc., and more particularly to a power-saving, durable magnetic power apparatus, that can be controlled to change the direction of the magnetic path.

The concept of magnetic force is obtained from natural magnets. Natural magnets attract non-magnetized iron chips. The end of a natural magnet, which attracts non-magnetized iron chips, is a magnetic pole. Hans Christian Oersted, a scientist of Denmark, discovered the phenomenon of magnetic force in 1819. Hans Christian Oersted watches the occurrence of a deflection phenomenon when approaching a magnetic needle to an electrically conducted conductor. Later studies indicate the presence of magnetic lines of force in a magnetic field. FIG. 11 shows the magnetic lines of force pasé from N pole of the magnetic M through the air to C pole of the magnet M. FIG. 12 shows magnetic lines of force pass from one end of a solenoid C through the air to the opposite end thereof after connection of electric current I to the solenoid C. It is apparent that the magnetic path is a closed path between N pole and S pole. In early 19 century, French scientist Ampere discovered same reason in the formation of the magnetic field of a magnet and the formation of the magnetic field of a solenoid, i.e., the formation of a magnetic field is due to the presence of an electric current on the inside or surface of the magnet. Nowadays, magnetic filed effect has been intensively used in electromagnetic valves, solenoids, relays, etc. FIG. 13 shows a conventional electromagnetic valve. When the coil 1C is energized, a magnetic force is produced to attract the iron core 1F, causing the valve port IV to be opened. This design uses a spring 1S to keep the iron core 1F in (the closed) position. The spring force of the spring 1S offsets a part of the magnetic force of the coil 1C. This design wastes much electric energy, and the produces much heat during operation. Similar designs are seen in Taiwan Patent Publication No. 319343; 290615; 115728; 268552; 304570; 155433; 222448; 182896; 212501; 241854.

SUMMARY OF THE INVENTION

The present invention provides a magnetic power apparatus, which eliminates the aforesaid drawbacks. It is one object of the present invention to provide a magnetic power apparatus, which eliminates the use of spring means to hold the iron core in position. It is another object of the present invention to provide a magnetic power apparatus, which consumes less electric power. It is still another object of the present invention to provide a magnetic power apparatus, which is inexpensive to manufacture. It is still another object of the present invention to provide a magnetic power apparatus, which is practical for use in solenoids, magnetic valves, and relays. According to one aspect of the present invention, the magnetic power apparatus comprises an outer shell made of magnetically conductive metal, the outer shell having a through hole on one side wall thereof, an iron core axially movably disposed inside the outer shell, a coil positioned in the outer shell around the iron core and controlled to move the iron core axially in the outer shell, a first permanent magnet and a second permanent magnet symmetrically mounted inside the outer shell and axially aligned at two opposite sides of the iron core with same pole aimed against each other, and a driving circuit disposed outside the outer shell and connected with a power output line thereof to the coil to charge a capacitor, the driving circuit outputting to the coil a positive impulse voltage when electrically connected, or a negative impulse voltage when electrically disconnected, causing the iron core to shift the iron core, and causing the first permanent magnet and the second permanent magnet to change magnetic path and to keep the iron core in shifted position. According to another aspect of the present invention, two magnetic guide rings are symmetrically provided between two distal ends of the coil and the first permanent magnet and second permanent magnet to enhance the magnetic force. According to still another aspect of the present invention, a non-magnetically conductive sleeve is mounted inside the outer shell to guide movement of said iron core.

BRIEF DESCRIPTION OF THE DRAWINGS

FIG. 3 illustrates the status of the magnetic lines of force of the present invention after provision of a positive impulse voltage from the driving circuit.

FIG. 4 illustrates, the status of the magnetic lines of force of the present invention after rightward movement of the iron core and power off of the coil.

FIG. 9 shows an application example of the present invention for use as a solenoid.

FIG. 10 shows another application example of the present invention used in an electromagnetic valve.

FIG. 11 illustrates the distribution of magnetic lines of force of a regular permanent magnet.

FIG. 12 illustrates the distribution of magnetic lines of force of a regular solenoid.

DETAILED DESCRIPTION OF THE PREFERRED EMBODIMENT

Figure 1:
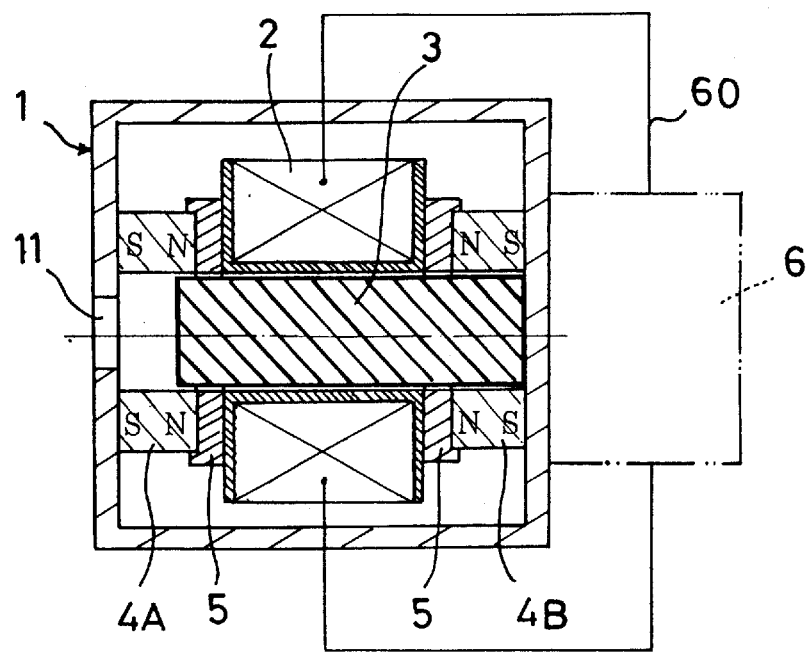
FIG. 1 is a sectional view of a magnetic power apparatus according to a first embodiment of the present invention, showing the iron core shifted rightwards.

Referring to FIG. 1, the present invention comprises an outer shell 1, which can have a cylindrical, rectangular, or any of a variety of shapes, an iron core 3 axially movably disposed inside the outer shell 1, and a coil 2 positioned in the outer shell 1 around the iron core 3. The outer shell 1 is made of magnetically conductive metal, having a through hole 11 through one side thereof in axial alignment with the iron core 3. A first permanent magnet 4A and a second permanent magnet 4B are symmetrically mounted inside the outer shell 1, and axially aligned at two opposite sides of the iron core 3 with same pole aimed against each other. A driving circuit 6 is disposed outside the outer shell 1, having a power output line 60 connected to the coil 2. When power supply is connected, the driving circuit 6 outputs a positive impulse voltage, and stores electric energy in a capacitor. When power supply is off, the driving circuit 6 outputs a negative impulse voltage. The transient positive or negative impulse voltage (about 0.01 second) causes the coil 2 to change magnetization direction, and to produce an active force, causing the iron core 3 to move. The operation of the driving circuit 6 also forces the first permanent magnet 4A and the second permanent magnet 4B to change magnetic path, causing the iron core 3 to be normally maintained in a particular position. Magnetic guide rings 5 are symmetrically provided between the coil 2 and the permanent magnets 4A and 4B to enhance the effect of magnetic force.

Figure 2:
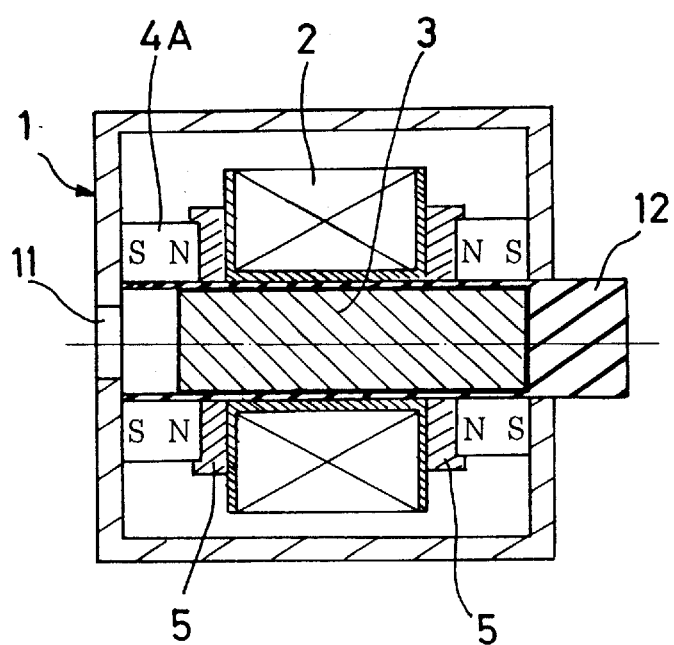
FIG. 2 is a sectional view of a magnetic power apparatus according to a second embodiment of the present invention, showing the iron core shifted rightwards.

FIG. 2 shows an alternate form of the present invention. According to this embodiment, a sleeve 12 is mounted inside the outer shell 1 around the iron core 3 to guide axial movement of the iron core 3. The sleeve 12 is made of non-magnetically conductive material, for example, copper. The use of the sleeve 12 does not affect the effect of the magnetic force of the coil 2 and the permanent magnets 4A and 4B.

FIG 3 shows the status of the magnetic lines of force of the present invention after provision of a positive impulse voltage from the driving circuit. When a magnetic force is produced greater than the first permanent magnet 4A and the second permanent magnet 4B after provision of a proper voltage to the coil 2, the paths of magnetic force (the imaginary line) of the first permanent magnet 4A and the second permanent magnet 4B are changed to the direction of the magnetic force (the real line) of the coil 2, thereby causing the iron core 3 to be moved rightwards by the magnetic force of the coil and the magnetic force of the permanent magnets. After rightward movement of the iron core 3, the coil 2 is disenergized, and the enclosed magnetic path of each permanent magnets 4A or 4B passes from the respective N pole through the corresponding magnetic guide ring 5 to the respective S pole, keeping the iron core 3 in the right side position (see FIG. 4).

Figure 5:
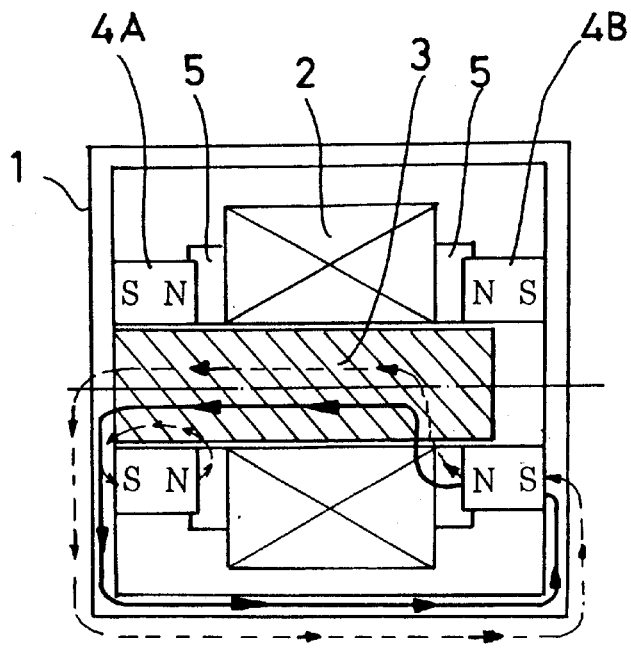
FIG. 5 illustrates the status of the magnetic lines of force of the present invention after provision of a negative impulse voltage from the driving circuit.
Figure 6:
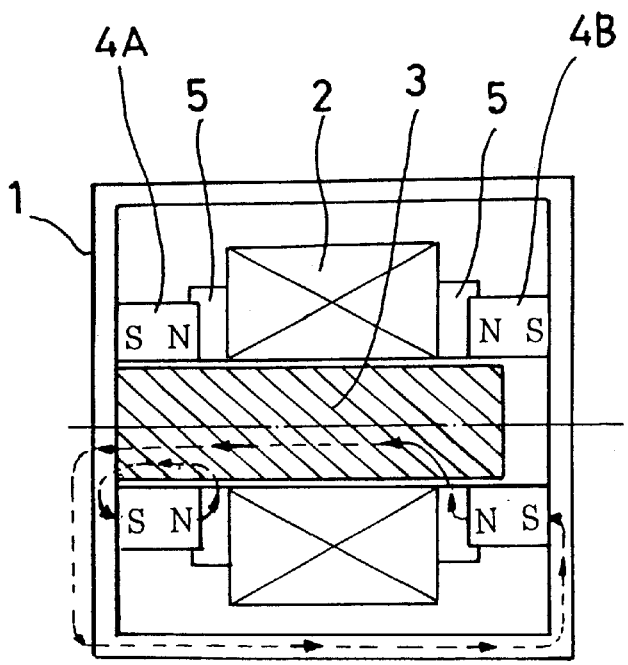
FIG. 6 illustrates the status of the magnetic lines of force of the present invention after leftward movement of the iron core and power off of the coil.

Referring to FIG. 5, when a negative impulse voltage, which is greater than the magnetic force of the permanent magnets 4A and 4B, is given from the driving circuit 6 to the coil 2, the paths of magnetic force (the imaginary line) of the first permanent magnet 4A and the second permanent magnet 4B are changed to the direction of the magnetic force (the real line) of the coil 2, thereby causing the iron core 3 to be moved leftwards by the magnetic force of the coil and the magnetic force of the permanent magnets. After leftward movement of the iron core 3, the coil 2 is disenergized, and the enclosed magnetic path of each permanent magnets 4A or 4B passes from the respective N pole through the corresponding magnetic guide ring 5 to the respective S pole, keeping the iron core 3 in the left side position.

As indicated above, the magnetic force of the coil 2 causes the iron core 3 to change its position, and simultaneously causes the first permanent magnet 4A and the second permanent magnet 4B to change their magnetic path, and the iron core 3 can be kept in position by means of the effect of the magnetic force of the permanent magnets 4A and 4B after disconnection of electricity from the coil 2. Therefore, the invention eliminates the use of spring means to keep the iron core in position (in prior art designs, the use of spring means greatly reduces the effect of forward magnetic force from the coil, i.e., much magnetic force must be provided from the coil to move the iron core and to conquer the spring force from spring means). Further, because an impulse voltage (about 0.01 second) is sufficient to causes the iron core to change its position, it is not necessary to continuously supply electric current to the coil. Therefore, the present invention saves much electric energy, prevents a short-circuit or overheat, and prolongs the service life of the magnetic power device.

Figure 7:
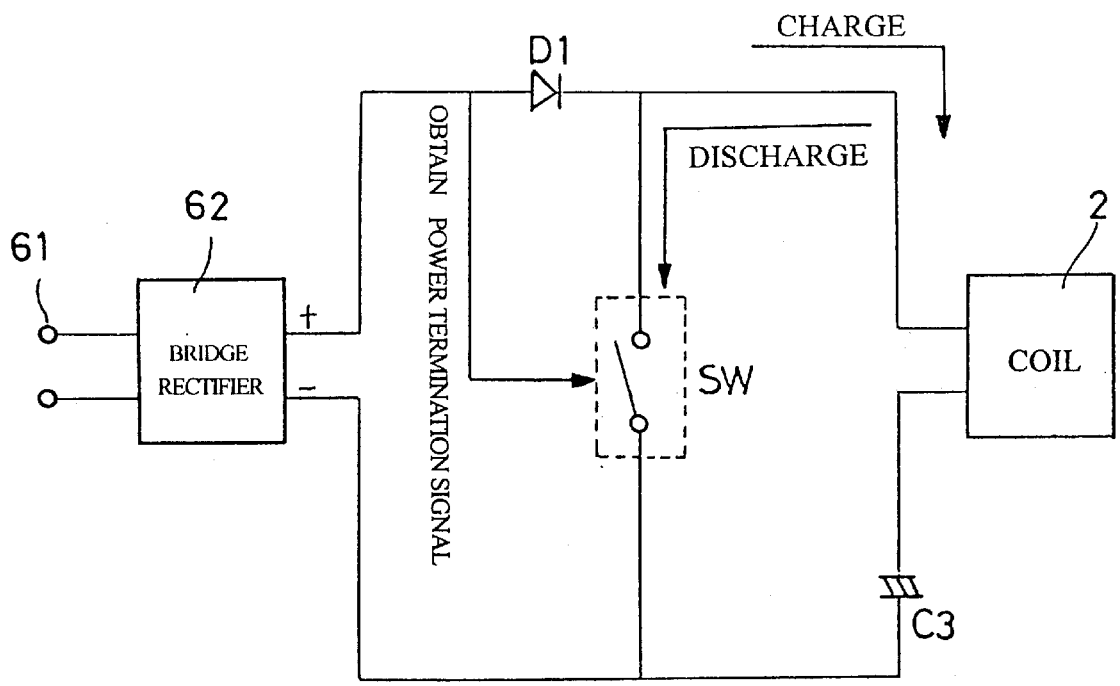
FIG. 7 is a circuit block diagram of the present invention, showing the arrangement of the driving circuit.
Figure 8:
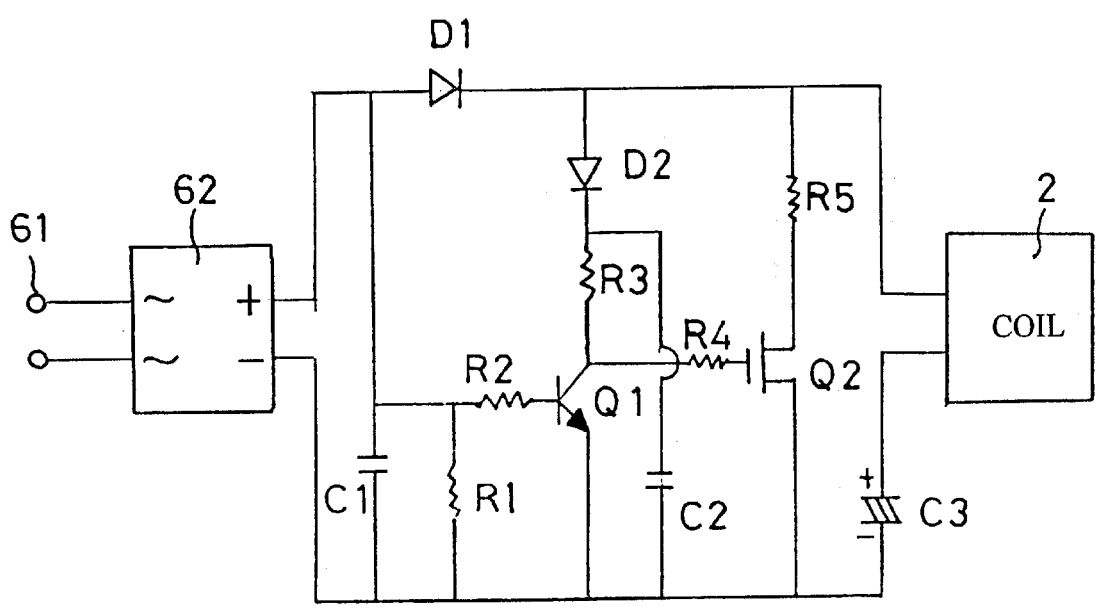
FIG. 8 is a detailed circuit diagram of the driving circuit according to the present invention.
Figure 13:
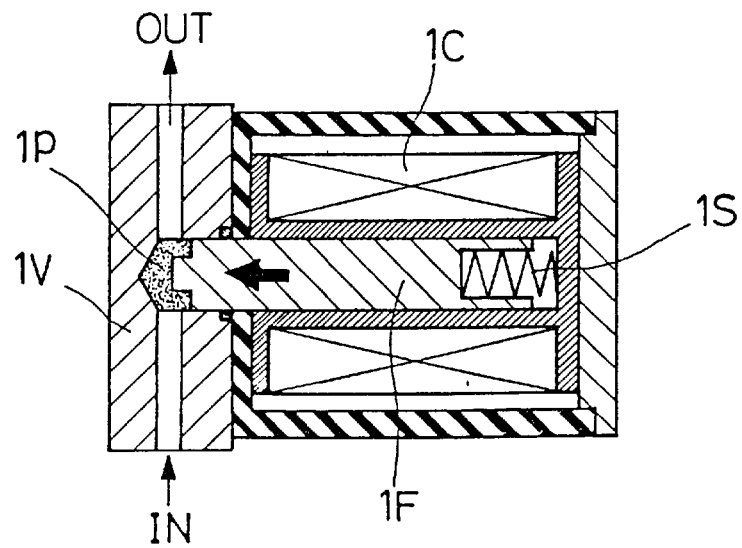
FIG. 13 is a sectional view of a conventional electromagnetic valve when disenergized.
Figure 14:
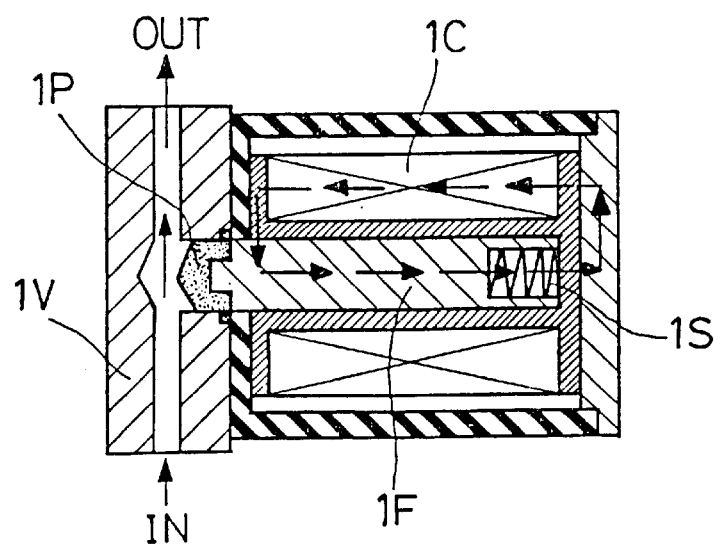
FIG. 14 is similar to FIG. 13 but showing the electromagnetic valve energized.

Referring to FIGS. 7 and 8 and FIGS. 1 and 3 again, the power output line 60 of the driving circuit 6 is connected to the coil 2. The driving circuit 6 comprises a bridge rectifier 62, and a plug 61. After connection of the plug 61 to power source, AC or DC power source is rectified by the bridge rectifier 62 into impulse DC current or directional DC current, which is then transmitted through a diode D1 to charge a capacitor C3 via the coil 2 and at the same time to energize the coil 2, thereby causing the iron core 3 to be shifted to the right side (see FIG. 3). When power source is continuously supplied, charging current is stopped after the capacitor C3 has been charged to the saturated status. Thereafter, the charging circuit simply compensates leakage current, keeping the capacitor C3 at a constant voltage. When power source is off, the discharging circuit receives a signal to drive a switch SW, causing the capacitor C3 to discharge a negative impulse voltage to the coil 2, and therefore the iron core 3 is moved leftwards by the magnetic force of the coil 2.

Referring to FIG. 8 again, the bridge rectifier 62 of the driving circuit 6 rectifies AC or DC power source into impulse DC current or directional DC current for charging the capacitor C3 through the coil 2. When AC power source is off, the discharging circuit obtains a signal to switch on the switch SW, which is comprised of a transistor Q2, thereby causing the capacitor C3 to provide a negative impulse voltage to the coil 2. The resistors R1 and R2, the capacitor C1 and the transistor Q1 keep the transistor Q2 of the switch SW off when the charging circuit works. Further, the diode D2, the capacitor C2 and the resistors R3 and R4 enable the capacitor C3 to discharge the voltage completely. The resistor R5 limits discharging current.

Referring to FIG. 9, an actuating rod 31 is connected to the iron core 3 and extended out of the outer shell 1 through the through hole 11, forming with the magnetic power apparatus a solenoid S. The solenoid S can then be used with contact switch means, forming a relay.

FIG. 10 shows an application example of the embodiment shown in FIG. 1. A valve block 7 is disposed in front of the outer shell 1, and two rubber gaskets 32 and 33 are respectively provided at the front and rear ends of the iron core 3. When the iron core 3 is moved in the sleeve 12, the operation of an electromagnetic valve V is achieved. A relief port 121 is formed on the rear end of the sleeve 12 for exhaust of return gas. The front end of the sleeve 12 extends out of the through hole 11 on the outer shell 1, and is coupled to the rubber gasket 71 at the valve block 7, preventing direct contact of the permanent magnets 4A and 4B with the fluid passing through the valve block 7.

It is to be understood that the drawings are designed for purposes of illustration only, and are not intended for use as a definition of the limits and scope of the invention disclosed.

What the invention claimed is:

1. A magnetic power apparatus comprising:
   an outer shell formed of magnetically conductive metal, solid outer shell having a through hole formed through one side thereof;
   an iron core axially movably disposed inside said outer shell and aligned with said through hole;

a coil positioned in said outer shell around said iron core and controlled to move said iron core axially in said outer shell;

a first permanent magnet and a second permanent magnet symmetrically mounted inside said outer shell, said first and second permanent magnets being respectively axially aligned adjacent two opposite ends of said iron core with like poles facing each other; and, a driving circuit disposed outside said outer shell and having a power output line connected to said coil, said driving circuit including a capacitor coupled in series with said coil and a switching device coupled in parallel with said series combination of said capacitor and said coil, said switching device being responsive to an application of a power source to said driving circuit or removal therefrom, said driving circuit outputting to said coil a positive impulse voltage when said power source is applied and a negative impulse voltage when said power source is removed, thereby causing said iron core to shift between a pair of axially displaced positions, and causing said first permanent magnet and said second permanent magnet to change magnetic path and to hold said iron core in said shifted position.

2. The magnetic power apparatus as recited in claim 1, wherein said switching device is a transistor.

3. The magnetic power apparatus as recited in claim 1, wherein said driving circuit includes a bridge rectifier having an input coupled to said power source, whereby said switching device is responsive to one of a DC power source and an AC power source.

4. The magnetic power apparatus as recited in claim 3, wherein said driving circuit includes:

a plurality of resistors and a capacitor connected together in a network, said network being coupled to an output of said bridge rectifier;

a first transistor having an input coupled to said network and an output coupled to said switching device, said switching device being a second transistor.

\* \* \* \* \*